(12) United States Patent
Lefebvre et al.

(10) Patent No.: US 7,697,006 B2
(45) Date of Patent: Apr. 13, 2010

(54) ENHANCED PERFORMANCE DISPLAY LISTS

(75) Inventors: Kevin T. Lefebvre, Fort Collins, CO (US); Don B Hoffman, Fort Collins, CO (US); Michael T Hamilton, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1668 days.

(21) Appl. No.: 10/427,618

(22) Filed: Apr. 30, 2003

(65) Prior Publication Data

US 2004/0217965 A1 Nov. 4, 2004

(51) Int. Cl.
*G06T 1/00* (2006.01)
*G06T 15/40* (2006.01)

(52) U.S. Cl. ..................... 345/522; 345/421
(58) Field of Classification Search ............. 345/501, 345/421
See application file for complete search history.

(56) References Cited

U.S. PATENT DOCUMENTS

| 5,926,185 | A * | 7/1999 | Vyncke et al. ............. 345/619 |
| 6,243,097 | B1 * | 6/2001 | Brokenshire et al. ........ 345/421 |
| 6,362,825 | B1 * | 3/2002 | Johnson ..................... 345/522 |
| 6,384,833 | B1 * | 5/2002 | Denneau et al. ............ 345/522 |
| 6,469,704 | B1 * | 10/2002 | Johnson ..................... 345/553 |
| 6,603,474 | B1 * | 8/2003 | Cobb et al. ................. 345/421 |
| 6,734,852 | B2 * | 5/2004 | Sowizral et al. ............ 345/420 |
| 7,170,513 | B1 * | 1/2007 | Voorhies et al. ............ 345/421 |
| 7,358,974 | B2 * | 4/2008 | Blythe et al. ............... 345/505 |

OTHER PUBLICATIONS

Foley et al., Computer Graphics: Principles and Practice, 1996, Addison-Wesley Publishing Company, Inc., Second Edition, pp. 175-177.*
C J Silverio, Beth Fryer, and Jed Hartman, "OpenGL Porting Guide," 1997, Silicon Graphics Inc. Document No. 007-1797-030.*
Nieder, Jackie; Davis, Tom; Woo, Mason; OpenGL Programming Guide, The Official Guide to Learning OpenGL, Release 1, Jun. 1993.

* cited by examiner

*Primary Examiner*—Ulka Chauhan
*Assistant Examiner*—Jason M Repko
(74) *Attorney, Agent, or Firm*—Kevin M. Hart

(57) ABSTRACT

A modified display list contains a series of n nested bounding volumes. The first bounding volume in the series contains the remaining n-1 bounding volumes the series. The second bounding volume contains the remaining n-2 bounding volumes in the series, and so on. Upon invocation, the graphics display system processes the modified list sequentially and tests the bounding volumes as they are encountered. As soon as a bounding volume is encountered whose coordinates define a region that should not be rendered, further sequential processing of rendering commands in the list may be halted. If any state commands remain in the list, those commands or an equivalent set of state commands may be executed, and then processing of the list is complete. Alternatively, if push/pop state commands exist on either side of the list, then processing of the list may be halted without more.

3 Claims, 3 Drawing Sheets

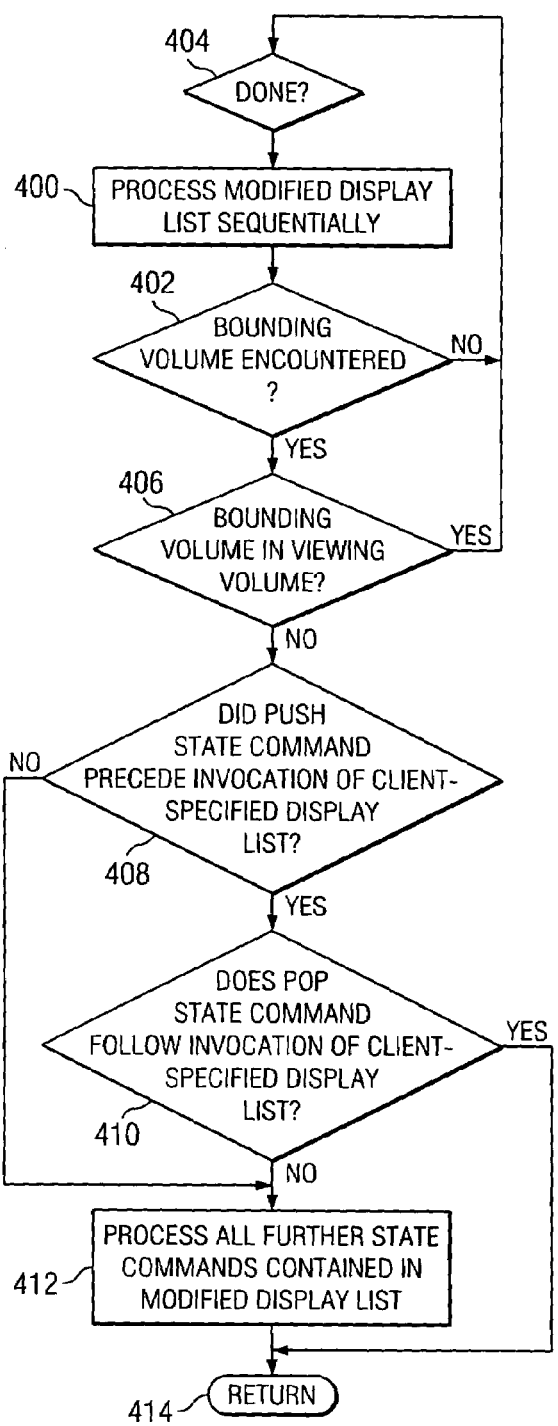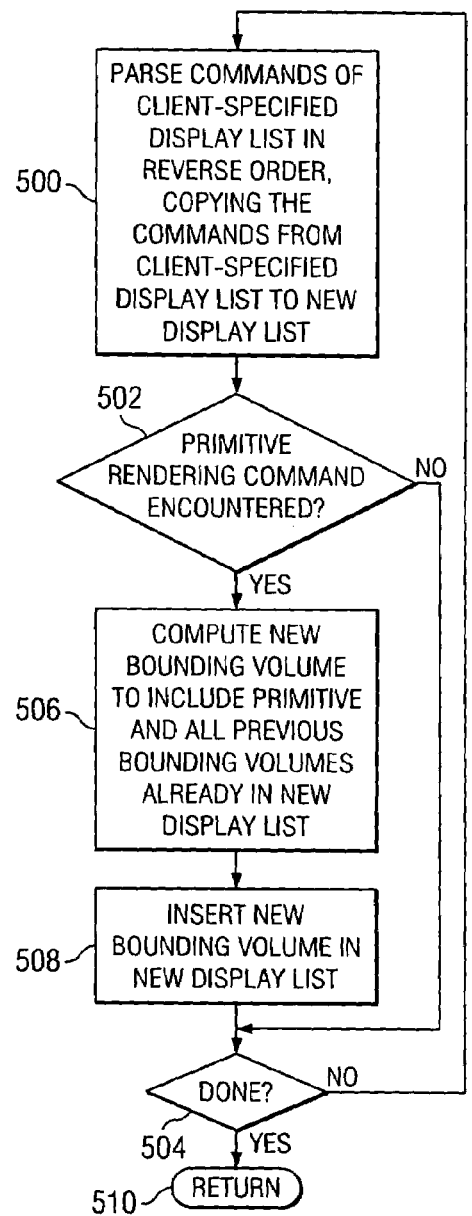

ENHANCED PERFORMANCE DISPLAY LISTS

FIELD OF THE INVENTION

This invention relates generally to the field of computer graphics.

BACKGROUND

OpenGL. The graphics standard known as "OpenGL" defines a software interface for controlling graphics display systems. More specifically, it defines a number of commands that may be issued by client software to cause an OpenGL-compliant graphics system to draw. Some OpenGL commands are designed to place the graphics system into a particular state (e.g., set the current color to a particular color, or set the current model view matrix to a certain value). Other commands are designed to specify primitives for rendering (e.g., define the vertices of a triangle or other polygon).

Display Lists. It is common for client software to issue OpenGL commands in what is called immediate mode so that the commands will be executed upon receipt by the graphics system. But OpenGL also includes a notion of display lists. A display list represents a set of one or more commands. Once created, a display list is stored for possible later or repeated invocation by client software. For example, a display list might be created for rendering a wheel and then invoked four times to draw the four wheels of a car. A display list may contain both rendering commands and state commands. For lists containing state commands, the effect of the state commands persists in an OpenGL-compliant display system after the list has been invoked. It is possible to call a second display list from within a first display list. For further background information on OpenGL and OpenGL display lists, see for example *OpenGL Programming Guide* (Addison-Wesley, 1993).

Bounding Volumes. One known performance enhancement technique in computer graphics is the concept of a bounding volume. For example, a simple shape such as a cube may be defined to enclose a more complex shape such as a star. In such an example the cube would be referred to as the bounding volume for the star. During rendering the coordinates defining the cube are compared with the coordinates defining a viewing volume. If the cube is outside the viewing volume, then the star is not rendered. It is computationally simpler to compare the viewing volume with a simple shape such as the cube than it is to compare it with a complex shape such as the star. Consequently, the use of bounding volumes helps to conserve resources and improve performance.

Bounding volumes may also be nested. For example, two objects in a scene may each have their own individual bounding volumes defined, and a third bounding volume may be defined to enclose the first two bounding volumes. If the third bounding volume is not in the viewing volume, then both of the objects can safely not be rendered. In such as case, testing the viewing volume against the third bounding volume saves computing resources that would have been required to test the first and second bounding volumes individually. Nested bounding volumes are often referred to as hierarchical bounding volumes.

The Hewlett-Packard Visualize Center SV6. In one OpenGL-compliant graphics system called the Hewlett-Packard Visualize Center SV6, display list logic utilized bounding volumes at two levels: the leaf level and the root level. First, the SV6 system created bounding volumes for each of the primitives defined in a display list. It did so on a primitive-by-primitive basis and stored the bounding volumes in the display list along with the corresponding primitives. This feature enabled culling to be performed on a primitive-by-primitive basis (the leaf level) whenever the display list was invoked. Second, the human user was able to set an environment variable if he wished to operate in a "stateless" display list mode. The implicit promise made by the user when operating in stateless display list mode was that no display lists created by his application would contain any state commands. When in stateless display list mode, for each list, the SV6 system created a single global bounding volume that enclosed all of the primitives in the list (the root level). It did this in addition to creating separate bounding volumes for each individual primitive at the leaf level. When operating in stateless display list mode, an entire list could possibly be culled when the list was invoked, depending on the outcome of testing the global bounding volume against the viewing volume. But stateless display list mode could not be used if even a single one of possibly numerous created display lists would contain a state command.

SUMMARY OF THE INVENTION

In a graphics display system according to a preferred embodiment of the invention, display list logic utilizes bounding volumes in a manner that is fully hierarchical, is transparent to the user, and works regardless of whether or not a list contains state commands.

In one aspect, a specified display list may contain rendering and state commands. A modified list is created corresponding to the specified list. The modified list contains a series of n nested bounding volumes interleaved with rendering and state commands identical or equivalent to those that were present in the specified list. The first bounding volume in the series contains the remaining n-1 bounding volumes the series. The second bounding volume contains the remaining n-2 bounding volumes in the series, and so on. Upon invocation, the graphics display system processes the modified list sequentially and tests the bounding volumes as they are encountered. As soon as a bounding volume is encountered whose coordinates define a region that should not be rendered, further sequential processing of rendering commands in the list may be halted. If any state commands remain in the list, those commands or an equivalent set of state commands may be executed, and then processing of the list is complete. Alternatively, if state commands remain in the list but the graphics display system has detected the presence of push/pop state commands on either side of the list, then the remaining state commands in the list need not be executed and processing of the list may be considered complete without more. In either case, the state of the graphics display system will be as expected upon completion of list processing even if a portion of the display list is culled as the result of a bounding volume test.

In another aspect, the modified list may be created automatically by parsing the specified list from back to front. When the nth rendering command is encountered, the nth bounding volume is computed to include the geometry specified by the nth rendering command. When the n-1th rendering command is encountered, the n-1th bounding volume is computed to include both the nth bounding volume and the geometry specified by the n-1th rendering command, and so on. Should any intervening matrix commands appear between the n-1th and the nth rendering commands, then computation of the n-1th bounding volume may be based on a transformed version of the nth bounding volume rather than on the nth bounding volume itself The transformed version of the nth bounding volume may be computed by applying the inverse of the intervening matrix commands to the nth bounding volume.

BRIEF DESCRIPTION OF THE DRAWINGS

FIG. 4 is a flow diagram illustrating an alternative preferred manner of performing the executing step of FIG. 1.

FIG. 5 is a flow diagram illustrating a preferred method for creating an enhanced performance OpenGL display list.

DETAILED DESCRIPTION OF THE PREFERRED EMBODIMENTS

Figure 1:
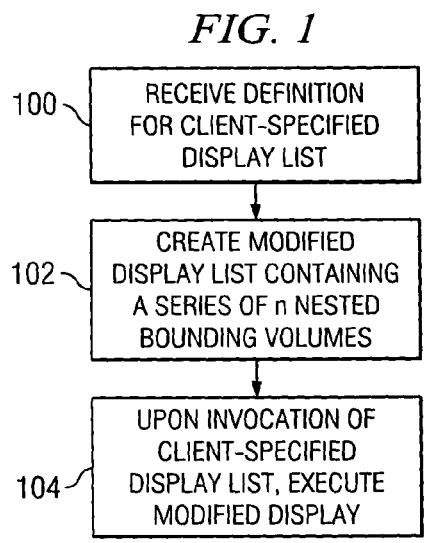
FIG. 1 is a flow diagram illustrating a method for processing an enhanced performance OpenGL display list according to a preferred embodiment of the invention.

FIG. 1 illustrates a method for processing an enhanced performance OpenGL display list according to a preferred embodiment of the invention. In step 100, the OpenGL implementation receives a display list definition from a client. Clients may present such a definition, for example, by issuing a new list command, a series of rendering, state or matrix commands, and then an end list command. Either as these commands are being issued or afterward, the OpenGL implementation then creates a modified display list containing a series of n nested bounding volumes (step 102).

An example will help to illustrate this. Assume that the commands in the client-specified display list are as follows:
state A
render 1
matrix a
state B
render 2
state C
render 3
matrix b
state D
render 4

Figure 2:
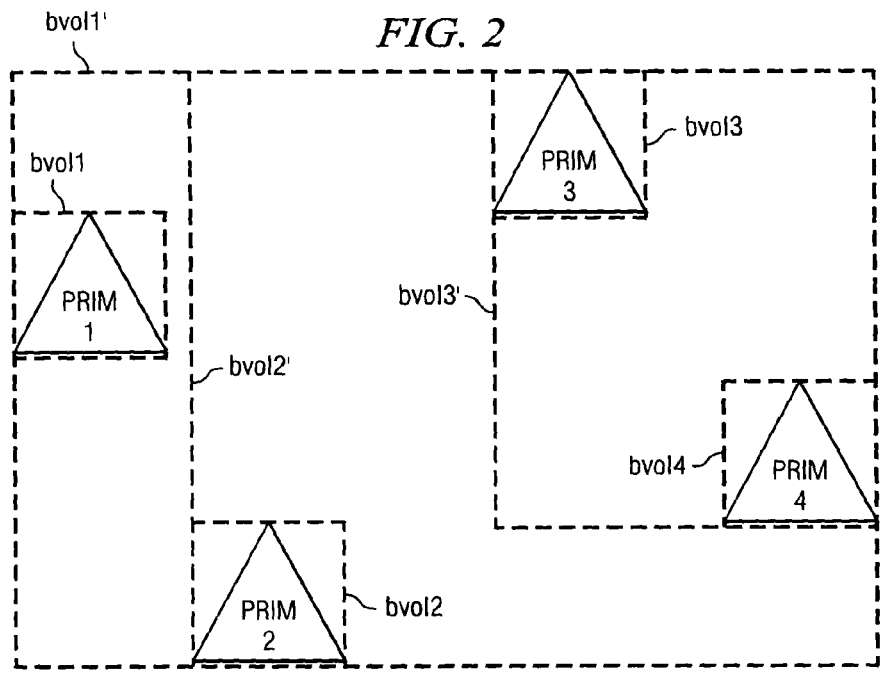
FIG. 2 is a block diagram illustrating a series of nested bounding volumes.

If so, then a series of 4 nested bounding volumes may be generated as shown in FIG. 2. Specifically, each primitive may have its own bounding volume defined in the modified display list. But in addition, new bounding volumes bvol 3', bvol 2' and bvol 1' are also defined in the modified display list. Bvol 3' includes both primitive 3 and bvol 4. Bvol 2' includes both primitive 2 and bvol 3'. And bvol 1' includes both primitive 1 and bvol 2'.

The enhanced performance (modified) version of the above display list, then, will look as follows:
state A
bvol 1'
bvol 1/render 1
matrix a
state B
bvol 2'
bvol 2/render 2
state C
bvol 3'
bvol 3/render 3
matrix b
state D
bvol 4/render 4

It should be noted that bvol 3', bvol 2' and bvol 1' are nested bounding volumes. By way of contrast, bvol 4, bvol 3, bvol 2 and bvol 1 are not nested per se, but are computed to just enclose their corresponding primitives. Inclusion of bvol 4, bvol 3, bvol 2 and bvol 1 in the modified display list is optional. When reference is made hereinafter to testing an encountered bounding volume against a viewing volume, the discussion will be referring to the nested bounding volumes and not to the optional bounding volumes that just enclose their corresponding primitives. In any event, once the modified display list has been created, when the client invokes the client-specified display list, the OpenGL implementation will execute the modified display list in lieu of the client-specified display list (step 104).

Figure 3:
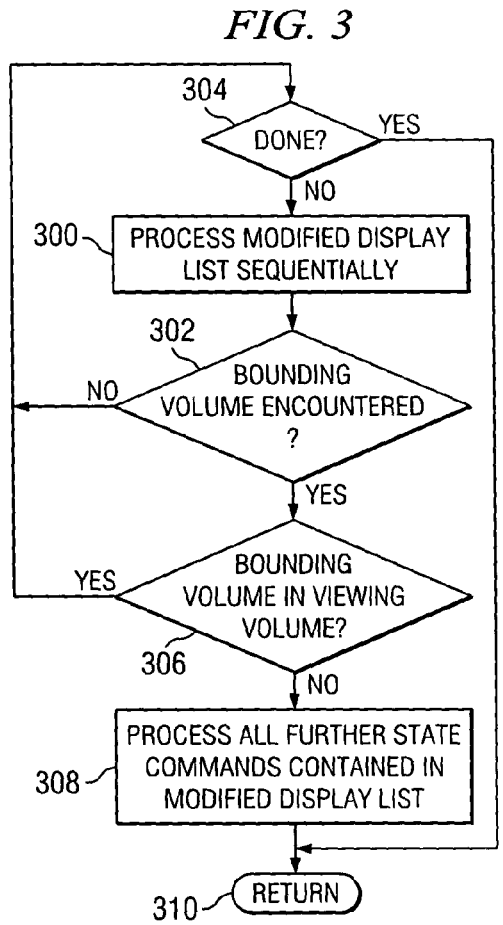
FIG. 3 is a flow diagram illustrating a preferred manner of performing the executing step of FIG. 1.

FIG. 3 illustrates a first preferred method for executing the modified display list. Commands in the modified list are processed sequentially from the beginning of the list (step 300). When bvol 1' is encountered, it is tested against a viewing volume of interest (steps 302 and 306). If no part of bvol 1' is in the viewing volume, then the process may return after first processing any further state commands remaining in the modified display list (steps 308, 310). In the case of our example, this will mean executing state B, state C, state D, matrix a, matrix b, and then returning. No further rendering commands in the list are executed. On the other hand, if all or part of bvol 1' is in the viewing volume, then processing of commands in the modified list continues as indicated by decision diamond 304. (Render 1 is executed if all or part of optional bvol 1 is in the viewing volume, then matrix a is executed, then state B is executed.)

When bvol 2' is encountered, it also is tested against the viewing volume (steps 302 and 306 again). If no part of bvol 2' is in the viewing volume, then the process may return after executing state C, state D, and matrix b. To complete the example, the following arrows indicate which state commands would have to be executed prior to returning in the event one of the nested bounding volumes is found to be outside the viewing volume:
state A
bvol 1'--->state B, C, D; matrix a, b; exit
bvol 1/render 1
matrix a
state B
bvol 2'--->state C, D; matrix b; exit
bvol 2/render 2
state C
bvol 3'--->state D; matrix b; exit
bvol 3/render 3
matrix b
state D
bvol 4/render 4

FIG. 4 illustrates a second preferred method for executing the modified display list. As in the method of FIG. 3, the modified list is processed sequentially (step 400). Each nested bounding volume encountered is tested against the viewing volume (steps 402, 406). But in the event a nested bounding volume is found to lie outside the viewing volume, further processing depends on whether state push and state pop commands were issued by the client just before and after invoking the display list (steps 408 and 410). If so, then the process may return without executing any further commands in the modified list—whether those commands might be state commands or otherwise. But if the state push and pop commands were not so issued, then any remaining state commands in the modified list must be executed prior to returning (step 412).

Although numerous methods may be used to generate the modified display list from the client-specified display list, a preferred method for doing so will now be discussed with reference to FIGS. 5 and 6. As steps 500, 504 indicate, the commands in the client-specified list may be parsed in reverse order (from the back of the list to the front). Commands appearing in the client-specified list may be copied to the new list. Upon encountering a primitive rendering command in the client-specified list in step 502 (such as the render 4 command in the above example), a new bounding volume is computed in step 506 and inserted into the new list in step 508. The new bounding volume should include the geometry of the primitive rendering command encountered as well as the geometry of all other bounding volumes previously inserted into the new list.

Figure 6:
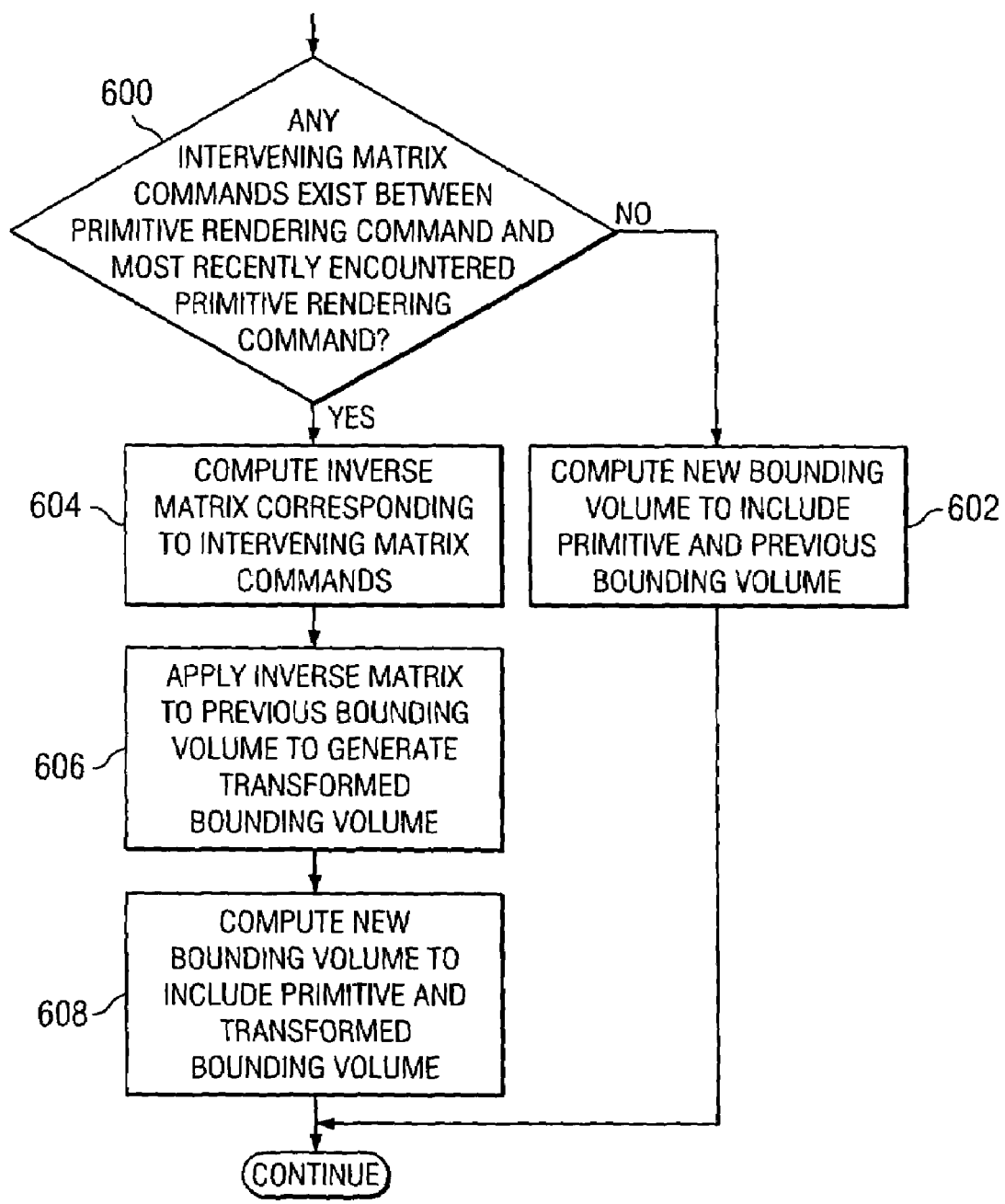
FIG. 6 is a flow diagram illustrating a preferred manner of performing the computing step of FIG. 5.

FIG. 6 illustrates a preferred method for computing each new bounding volume. Computation of each new bounding volume depends on whether any intervening matrix commands exist between the newly-encountered primitive rendering command and the previously-encountered primitive rendering command (step 600). By way of illustration, when the render 3 command is encountered in the above example, we see that a matrix b command intervened between the render 3 command (the newly-encountered rendering command) and the render 4 command (the previously-encountered rendering command). If any intervening matrix commands are detected in step 600, then computation of the new bounding volume proceeds according to steps 604, 606, 608. Specifically, an inverse matrix is computed to represent the inverse of the intervening matrix commands (step 604). In step 606, the inverse matrix is applied to the previously-generated bounding volume—bvol 4 in our example—to produce a transformed bounding volume. In step 608, a new bounding volume—bvol 3' in our example-is computed to include the newly encountered primitive as well as the transformed bounding volume. If intervening matrix commands are not detected in step 600, then the inverse matrix operations are not required, and the new bounding volume may be computed simply to include the geometry of the newly-encountered primitive as well as the geometry of the previously-generated bounding volume (step 602).

Completing the example above using the method of FIG. 6, the nested bounding volumes would be computed as follows:

bvol 3'=invMatrix b*bvol4+bvol 3
bvol 2'=bvol 3'+bvol 2
bvol 1'=invMatrix a*bvol2'+bvol 1

While the invention has been described in detail with reference to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims.

What is claimed is:

1. A method for processing a display list, comprising:
receiving a definition for a client-specified display list;
creating a modified display list corresponding to the client-specified display list, the modified display list containing a series of n nested bounding volumes where n is greater than two; and
upon invocation of the client-specified list, executing the modified display list in lieu of the client-specified display list;
wherein each one of the client-specified display list and the modified display list represents one or more commands executable by a computer graphics system; and
wherein executing the modified display list comprises:
processing the modified display list sequentially;
as they are encountered, testing the series of n nested bounding volumes against a viewing volume; and
if a bounding volume is encountered whose coordinates define a region that should not be rendered:
not processing any further rendering commands contained in the modified display list;
processing all further state commands contained in the modified display list; and
returning from processing the modified display list.

2. The method of claim 1, wherein processing all further state commands comprises processing all further state commands that include one or more of a command to set a color and a command to set a current model view matrix to a particular value.

3. The method of claim 1, wherein not processing any further rendering commands comprises not processing any further rendering commands for rendering primitives.

* * * * *